United States Patent
Yook et al.

(10) Patent No.: US 10,084,965 B2
(45) Date of Patent: Sep. 25, 2018

(54) OMNIDIRECTIONAL HIGH RESOLUTION TRACKING AND RECORDING APPARATUS AND METHOD

(71) Applicant: KOREA UNIVERSITY RESEARCH AND BUSINESS FOUNDATION, Seoul (KR)

(72) Inventors: Dong Suk Yook, Seoul (KR); Tae Woo Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 169 days.

(21) Appl. No.: 15/187,780

(22) Filed: Jun. 21, 2016

(65) Prior Publication Data

US 2017/0048498 A1    Feb. 16, 2017

(30) Foreign Application Priority Data

Aug. 11, 2015  (KR) .................. 10-2015-0113100

(51) Int. Cl.
   *H04N 5/232*   (2006.01)
   *H04N 7/18*    (2006.01)
   *G10K 11/34*   (2006.01)

(52) U.S. Cl.
   CPC ......... *H04N 5/23296* (2013.01); *H04N 7/181* (2013.01); *H04N 7/185* (2013.01); *G10K 11/348* (2013.01)

(58) Field of Classification Search
   CPC .... H04N 7/23296; H04N 7/181; H04N 7/185; G10K 11/348
   See application file for complete search history.

(56) References Cited

U.S. PATENT DOCUMENTS

2006/0256660 A1* 11/2006 Berger .................. G01S 5/20
                                                  367/124
2011/0310219 A1* 12/2011 Kim ................. G08B 13/19643
                                                  348/36

FOREIGN PATENT DOCUMENTS

JP    2002123878 A    4/2002
JP    2006191411 A    7/2006
(Continued)

OTHER PUBLICATIONS

Takanobu Nishiura et al., "Localization of Multiple Sound Sources Based on a CSP Analysis With a Microphone Array", Acoustics, Speech, and Signal Processing, 2000, IEEE Conference on vol. 2, 4 pages.

(Continued)

*Primary Examiner* — Michael Teitelbaum
(74) *Attorney, Agent, or Firm* — Hauptman Ham, LLP

(57) ABSTRACT

Omnidirectional high resolution tracking and recording apparatus and method are disclosed. The high resolution tracking and recording apparatus comprises a pan/tilt/zoom camera executable rotation and zoom-in; assistant cameras configured to have fisheye lens; microphones performable beam steering; and a processor configured to control to search a location of an important object in a recorded image by analyzing an image taken by the pan/tilt/zoom camera and the assistant cameras and a sound source recorded by the microphones, rotate the pan/tilt/zoom camera to the searched location, perform zoom-in of the pan/tilt/zoom camera, and amplify a sound occurred in a direction of a sound source by searching the direction of the sound source through preset algorithm.

6 Claims, 5 Drawing Sheets

(56) References Cited

FOREIGN PATENT DOCUMENTS

| KR | 1020090118718 A | 11/2009 |
| KR | 1020130000660 A | 1/2013 |

OTHER PUBLICATIONS

Korean Office Action for corresponding Korean Patent Application No. 10-2015-0113100 dated Jun. 15, 2016.

* cited by examiner

US 10,084,965 B2

OMNIDIRECTIONAL HIGH RESOLUTION TRACKING AND RECORDING APPARATUS AND METHOD

CROSS REFERENCE TO RELATED APPLICATION

This application claims the priority of Korean Patent Application No. 10-2015-0113100 filed on Aug. 11, 2015 in the Korean Patent and Trademark Office. This application, in its entirety, is incorporated herein by reference.

TECHNICAL FIELD

The present disclosure relates to an omnidirectional high resolution tracking and recording apparatus and method.

BACKGROUND ART

A CCTV has limited view angle due to physical constraint of lens of a camera.

Accordingly, in the event of wanting to monitor range of wide angle at open space, a number of CCTVs should be placed in multi directions, wherein the number corresponds to number generated by dividing the monitored angle by the view angle of the camera.

However, it is very expensive if every camera is placed with high resolution. This is because the high resolution camera and devices for processing simultaneously photographed high-resolution images and storing the processed images are high-priced.

Hence, it is necessary to develop a CCTV arrangement method capable of monitoring wide open space with effective cost.

Most of scenes (image and sound) taken by the CCTV are wasted not being used. Accordingly, it is not necessary to take most of the images with high resolution.

Korean laid-open No. 2010-0103109 (title: apparatus and method for unmanned surveillance using omnidirectional camera and pan/tilt/zoom camera) discloses a method of tracking and photographing a surveillance object according to a series of processes through the omnidirectional camera and the pan/tilt/zoom camera.

However, conventional techniques disclose a process of taking an omnidirectional image, but do not disclose a method of taking only necessary image with high resolution.

Additionally, the conventional techniques do not disclose a method of amplifying a sound source received from a place on which an object to be recorded with high resolution locates.

SUMMARY

To solve problem of the conventional technique, the invention is to provide an omnidirectional high resolution tracking and recording apparatus and method of obtaining an image of only necessary area with high resolution with low cost.

In one aspect, the invention is to provide a high resolution tracking and recording apparatus comprising: a pan/tilt/zoom camera executable rotation and zoom-in; assistant cameras configured to have fisheye lens; microphones performable beam steering; and a processor configured to control to search location of an important object in a recorded image by analyzing an image taken by the pan/tilt/zoom camera and the assistant cameras and a sound source recorded by the microphones, rotate the pan/tilt/zoom camera to the searched location, perform zoom-in of the pan/tilt/zoom camera, and amplify a sound occurred in a direction of a sound source by searching the direction of the sound source through preset algorithm.

The processor controls so that a recording starts after the pan/tilt/zoom camera is rotated to the location of the important object and performs the zoom-in.

Coordinates having the same arrival delay time about every pair of the microphones of coordinates in sound source direction search range are clustered to clusters, and clusters having arrival delay time smaller than preset value about the every pair of the microphones of the clusters are clustered into groups.

The preset value corresponds to $2\pi/5$ mis-alignment.

The processor calculates an output power of each of representative clusters in the groups, searches n groups in high order of the output power, wherein n is a natural number of above 1, and determines location of coordinates having maximum output power of every coordinates in the n groups as the location of the sound source.

In another aspect, the invention is to provide a high resolution tracking and recording method comprising: obtaining an image taken by a pan/tilt/zoom camera executable rotation and zoom-in and assistant cameras having fisheye lens; obtaining sound using microphones; searching a location of an important object in a recording image by analyzing the obtained image and a sound source recorded by the microphones; rotating the pan/tilt/zoom camera to the searched location and performing zoom-in of the pan/tilt/zoom camera; searching direction of the sound source through preset algorithm; and amplifying the sound occurred in the searched direction of the sound source.

An apparatus and a method of the invention may record only necessary area with high resolution image through one pan/tilt/zoom camera and cameras having fisheye lens.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
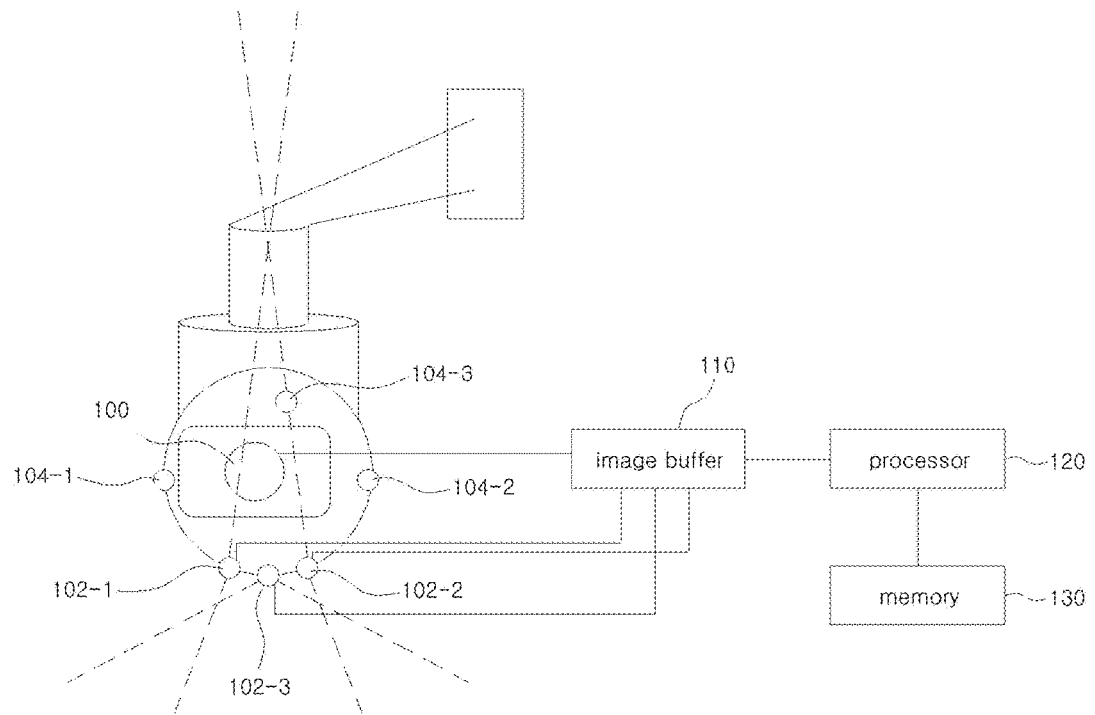
FIG. 1 is a view illustrating an omnidirectional high resolution tracking and recording apparatus according to one embodiment of the invention.

The invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Hereinafter, various embodiments of the invention will be described in detail with reference to accompanying drawings.

FIG. 1 is a view illustrating an omnidirectional high resolution tracking and recording apparatus according to one embodiment of the invention.

In FIG. 1, the omnidirectional high resolution tracking and recording apparatus of the present embodiment may include a high resolution pan/tilt/zoom camera 100, cameras 102-1 to 102-3 (hereinafter, referred to as '102') in which fisheye lens are mounted and microphones 104-1 to 104-3.

Here, the pan/tilt/zoom camera 100 indicates a camera which has preset view angle and can take an image with high resolution, and cameras 102 having the fisheye lens mean cameras which can take omnidirectional photograph and take an image with low resolution.

In one embodiment, microphones may be equipped for the purpose of searching a direction (direction of a sound source) in which a sound occurs and amplifying a sound propagated in the searched direction.

Hereinafter, a process of searching the direction of the sound source using the microphones will be described in detail.

As shown in FIG. 1, the apparatus of the present embodiment includes a processor 120 for searching location (location at which photographing is necessary because movement of an object in an image occurs) at which an event occurs through analysis of the image and amplifying the sound received from the sound source through the searching the direction of the sound source. The processor 120 performs searching of recording location and searching of the direction of the sound source by using program instructions stored in a memory 130.

The processor 120 controls rotation or zoom-in of the camera 100 according to the searched result.

The processor 120 controls so that the image obtained at the location (recording location) at which the movement occurs is recorded in a storage unit (not shown).

Figure 2:
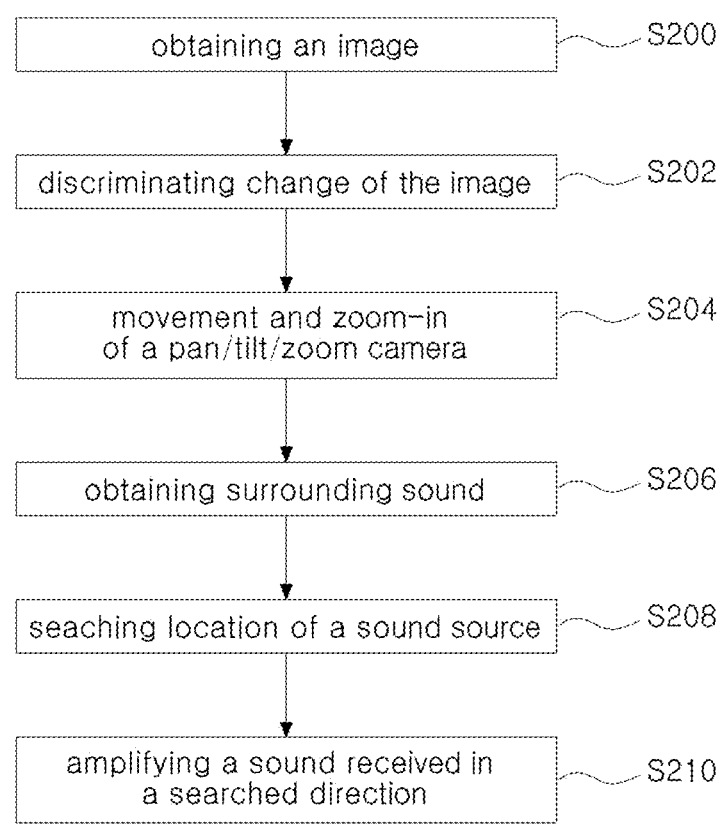
FIG. 2 is a flowchart illustrating a high resolution tracking and recording method according to one embodiment of the invention.

FIG. 2 is a flowchart illustrating a high resolution tracking and recording method according to one embodiment of the invention.

Referring to FIG. 2, the high resolution tracking and recording apparatus obtains an image through the cameras 100 and 102 in a step of S200, and discriminates whether or not change of the image occurs through analysis of the obtained image in a step of S202.

An image photographed shortly before is stored in an image buffer 110, and the apparatus discriminates whether or not change of the image occurs through comparison of an image (present image) obtained at present time and previous image in the step of S202.

For example, the present image and the previous image may have considerable difference in the event that great movement of the object in the image occurs, and the apparatus may discriminate whether or not an event (emergency situation) occurs through an image analysis algorithm.

Particularly, the high resolution tracking and recording apparatus measures color change amount of each of pixels from the previous image and the present image, and extracts pixels of which change amount is more than critical value.

In a step of S204, the high resolution tracking and recording apparatus clusters the extracted pixels, rotates the pan/tilt/zoom camera 100 in a direction of a cluster having highest size of clusters according to the clustering, and performs zoom-in.

To search location of important object, analysis of the sound source recorded through the microphones 104 may be performed with analysis of the image.

In one embodiment, the direction of the sound source is searched so as to amplify the sound received in a direction viewed after the pan/tilt/zoom camera 100 rotates.

The high resolution tracking and recording apparatus obtains surrounding sound through the microphones 104 in a step of S206, and searches the direction of the sound source using predetermined algorithm in a step of S208.

In a step of S210, the apparatus amplifies the sound received in the searched direction of the sound source.

In one embodiment, the apparatus may record selectively only an image at the location at which the event occurs, amplify only the sound at the location and store the image and the sound, thereby enhancing more surveillance efficiency.

Hereinafter, the algorithm of searching the location of the sound source of the invention will be described in detail.

The algorithm of searching the direction of the sound source according to the invention may be defined as a method of measuring the direction of the sound source with high speed using two level search space clustering TL-SSC.

The method divides coordinates in a lookup table into a series of groups and searches a small number of groups which may include a global maximum power area.

This may reduce sharply a number of search candidate coordinates with assuring accuracy of searching of the direction.

A steered response power phase transform SRP-PHAT based sound source localization SSL will be first described before the TL-SSC of the invention is described.

The SRP-PHAT based SSL performs beam steering of microphone array to search location corresponding to maximum output power.

An output y(t,q) of a delay-and-sum beamformer focused at a time t and a location q is as follows.

$$y(t, q) = \sum_{m=1}^{M} x_m(t + \tau_{m,q}) \quad \text{[Equation 1]}$$

Here, M means a number of the microphone, $x_m(t)$ indicates a signal received to mth microphone at the time t, $\tau_{m,q}$ means a time taken for propagation of the sound from the location q to the mth microphone.

A filter-and-sum beamformer using weight function may be used for overcoming complicated noise caused by room reverberation.

A filter-and-sum version of equation 1 in a frequency domain is expressed as equation 2.

$$Y(\omega, q) = \sum_{m=1}^{M} G_m(\omega) X_m(\omega) e^{j\omega \tau_{m,q}} \quad \text{[Equation 2]}$$

Here, $X_m(\omega)$ and $G_m(\omega)$ indicate a Fourier transform and an impulse response of a microphone signal corresponding to the mth microphone, respectively.

The microphone signal in equation 2 is phase-arranged by propagation delay and sum after a filter is applied.

The SRP-PHAT based SSL focuses to each of space point q through the beam steering of the microphone, and an output power P(q) at the space point q is calculated as shown in equation 3.

$$P(q) = \int_{-\infty}^{\infty} |Y(\omega, q)|^2 d\omega \quad \text{[Equation 3]}$$

$$= \int_{-\infty}^{\infty} \left( \sum_{l=1}^{M} G_l(\omega) X_l(\omega) e^{j\omega\tau_{l,q}} \right) \times$$

$$\left( \sum_{k=1}^{M} G_k^*(\omega) X_k^*(\omega) e^{-j\omega\tau_{k,q}} \right) d\omega$$

$$= \sum_{l=1}^{M} \sum_{k=1}^{M} \int_{-\infty}^{\infty} \Psi_{lk}(\omega) X_l(\omega) X_k^*(\omega) e^{j\omega(\tau_{l,q}-\tau_{k,q})} d\omega$$

Here, $\Psi_{lk}(\omega) = G_l(\omega) G_k^*(\omega)$, and $\Psi_{lk}(\omega)$ is defined as equation 4 so as to reduce echo effect.

$$\Psi_{lk}(\omega) \equiv \frac{1}{|X_l(\omega) X_k^*(\omega)|} \quad \text{[Equation 4]}$$

A steered response power P(q) for each of candidate locations is calculated, then a location having maximum output power is determined as the direction of the sound source as shown in equation 5.

$$\hat{q} = \arg \max_{q} P(q) \quad \text{[Equation 5]}$$

However, since the above search process is performed at every location as shown in equation 5, the problem exists in that the SRP-PHAT based SSL has very high calculation cost.

The invention provides a TL-SSC in order to solve scalability problem mentioned in background art.

The TL-SSC is invented based on the fact that the output power is high at global maximum power location.

Figure 3:
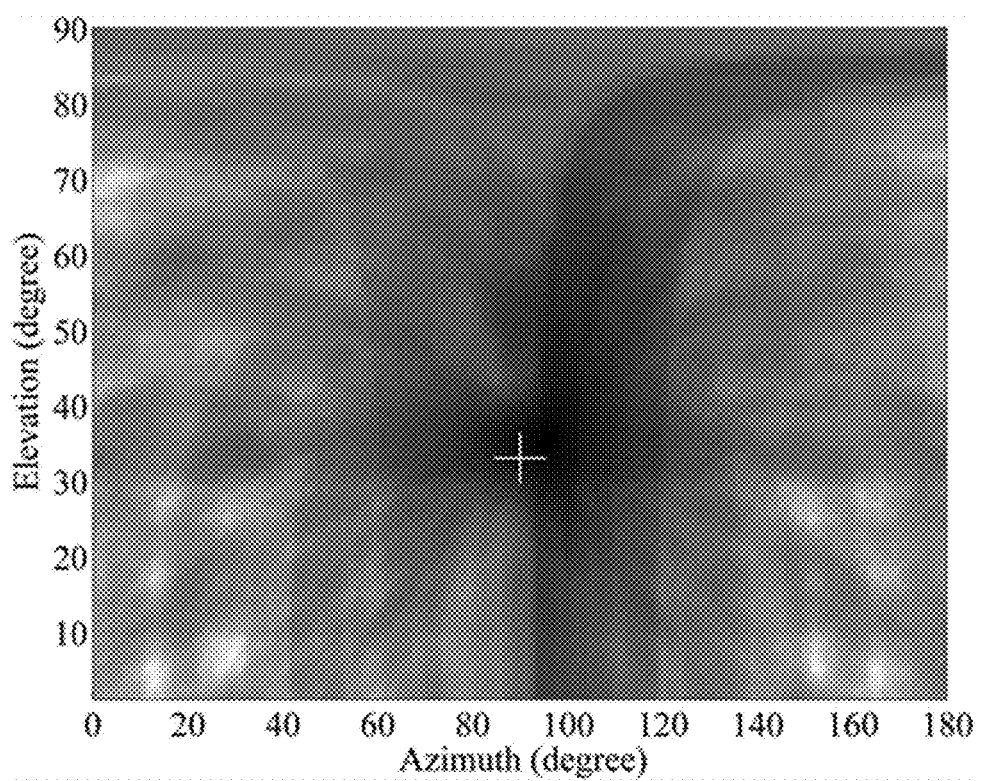
FIG. 3 is a view illustrating one example of a SRP-PHAT energy map of an output power formed according to azimuth and elevation function.

FIG. 3 is a view illustrating one example of a SRP-PHAT energy map of an output power formed according to azimuth and elevation function.

An area having darker-color indicates an area of which the output power is high, and a cross indication means real direction of the sound source.

Here, it is verified that considerable wide dark area exists surrounding the direction of the sound source.

This shows that an output power of the beamformer is maintained with high value though the beamformer is a little mistakenly aligned. Accordingly, coordinates having mis-alignment smaller than $2\pi/5$ in phase may be considered as right coordinates having adequate high output power.

Accordingly, the method may search a group including a global maximum power coordinates only by dividing total search range into a series of groups so that the mis-alignment is smaller than $2\pi/5$ and scanning a maximum power about only representative cluster of each of the groups.

Particularly, in one embodiment, coordinates having the same arrival delay time about every pair of the microphones of coordinates in sound source direction search range are clustered to clusters, and clusters having arrival delay time smaller than preset value about every pair of the microphones of the clusters are clustered in groups.

Here, the preset value corresponds to $2\pi/5$ mis-alignment.

In one embodiment, the coordinates in the lookup table are again grouped in a second level as shown in equation 6.

$$\sum_{i=1}^{I} \sum_{j=1}^{J} p(q_i \in z_j) e(q_i, z_j) = 0 \quad \text{[Equation 6]}$$

$$e(q_i, z_j) = \sum_{k=1}^{M} \sum_{l=1}^{M} d(s_{k,l,q_i}, s_{k,l,z_j})$$

$$d(s_{k,l,q_i}, s_{k,l,z_j}) = \begin{cases} 0, & \text{if } |s_{k,l,q_i} - s_{k,l,z_j}| \leq \theta \\ 1, & \text{otherwise} \end{cases}$$

Here, I means a number of coordinates in the lookup table, and J indicates a number of the groups.

$p(q_i \in z_j)$ is 1 if ith coordinate $q_i$ belongs to jth group, otherwise is 0.

$e(q_i, z_j)$ means clustering error and is defined as sum of every pair of microphones $d(S_{k,l,q}, S_{k,l,z})$.

$S_{k,l,q}$ means a time difference of arrival TDOA from the location q to kth pair and lth pair of the microphones. It is assumed that $d(S_{k,l,q}, S_{k,l,z})$ is 0 if difference of $S_{k,l,q}$ and $S_{k,l,z}$ is smaller than predetermined critical value, otherwise is 1.

An initial value of J is 1 and increases by 1 until equation 6 is satisfied. $p(q_i \in z_j)$, $e(q_i, z_j)$ and $z_j$ are updated about every i and j according to J increases, like a k-means algorithm.

The critical value is defined as equation 7 so as to satisfy constraint of $2\pi/5$ mis-alignment.

$$\theta = \text{round}\left( \frac{1}{5} \times \frac{\lambda}{c} \times r \right) \quad \text{[Equation 7]}$$

Here, $\lambda$, c and r mean wavelength, velocity of sound and sampling rate, respectively.

The critical value depends on a maximum frequency of the sound, the wavelength corresponds to 5.5 cm in case of human voice, and the sampling rate is used with 6 kHz for SSL.

The pre-calculated lookup table and representative clusters of clustered groups are used for the second level search.

The n output power groups in high order of the output power are selected in the first level, and detailed search of the n output power groups is performed in the second level.

Figure 4:
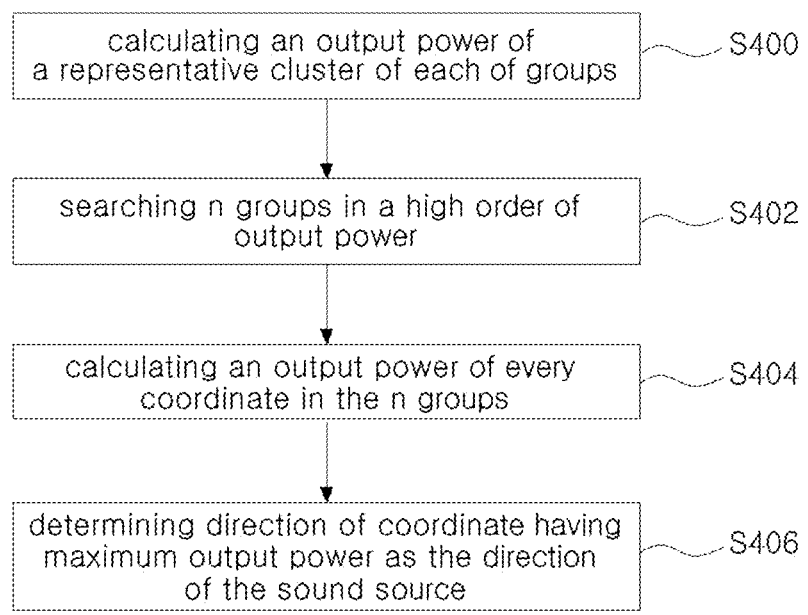
FIG. 4 is a flowchart illustrating a process of searching direction of a sound source according to one embodiment of the invention.

FIG. 4 is a flowchart illustrating a process of searching direction of a sound source according to one embodiment of the invention.

FIG. 4 will be described with reference to an example of group division in FIG. 5.

Figure 5:
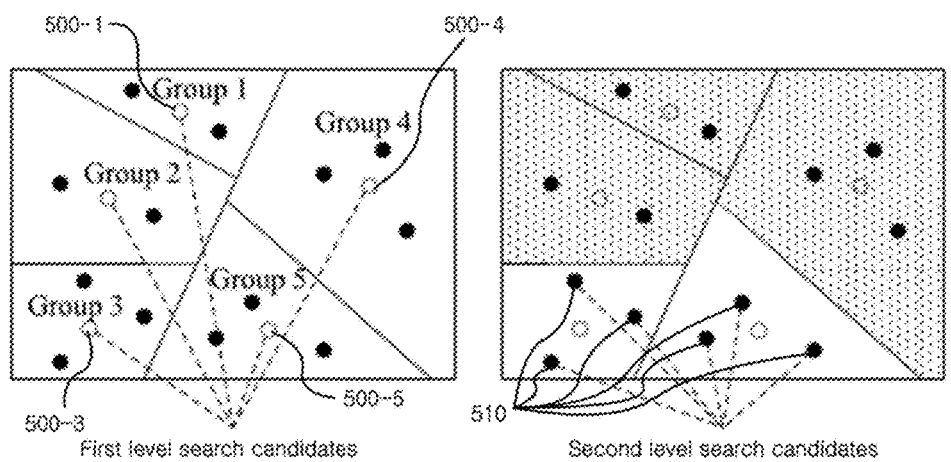
FIG. 5 is a view describing a process of searching direction of a sound source according to one embodiment of the invention.

Referring to FIG. 4 and FIG. 5, an output power of representative clusters 500-1 to 500-5 of respective groups Group 1 to Group 5 may be calculated by using equation 3 (using the SRP-PHAT algorithm) in a step of S400.

In a step of S402, n groups in high order of the output power are searched through calculation of the output power about the representative cluster, wherein n is a natural number of above 1.

In FIG. 5, Group 3 and Group 5 are selected through the step of S402.

In a step of S404, an output power of every coordinates 510 in the n groups is calculated by using equation 3.

In a step of S406, direction of a coordinates having a maximum output power of coordinates belonging to the n groups is searched.

One of the coordinates 510 is determined as a maximum output power through the step of S406, and direction corresponding to the determined coordinates may be determined as the direction of the sound source.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. An omnidirectional tracking and recording apparatus comprising:
   a pan/tilt/zoom camera executable rotation and zoom-in;
   assistant cameras configured to have fisheye lens;
   microphones performable beam steering; and
   a processor configured to control to search a location of a surveillance object in a recorded image by analyzing an image taken by the pan/tilt/zoom camera and the assistant cameras and a sound source recorded by the microphones, rotate the pan/tilt/zoom camera to the searched location, perform zoom-in of the pan/tilt/zoom camera, and amplify a sound occurred in a direction of a sound source by searching the direction of the sound source through preset algorithm,
   wherein coordinates having the same arrival delay time about every pair of the microphones of coordinates in sound source direction search range are clustered to clusters, and clusters having arrival delay time smaller than preset value about the every pair of the microphones of the clusters are clustered into groups.

2. The omnidirectional tracking and recording apparatus of claim 1, wherein the processor controls so that a recording starts after the pan/tilt/zoom camera is rotated to the location of the important object and performs the zoom-in.

3. The omnidirectional tracking and recording apparatus of claim 1, wherein the preset value corresponds to $2\pi/5$ mis-alignment.

4. The omnidirectional tracking and recording apparatus of claim 1, wherein the processor calculates an output power of each of representative clusters in the groups, searches n groups in high order of the output power, wherein n is a natural number of above 1, and determines a location of coordinates having a maximum output power of every coordinates in the n groups as the location of the sound source.

5. An omnidirectional tracking and recording method comprising:
   obtaining an image taken by a pan/tilt/zoom camera executable rotation and zoom-in and assistant cameras having fisheye lens;
   obtaining sound using microphones;
   searching a location of a surveillance object in a recording image by analyzing the obtained image and a sound source recorded by the microphones;
   rotating the pan/tilt/zoom camera to the searched location and performing zoom-in of the pan/tilt/zoom camera;
   searching direction of the sound source through preset algorithm; and
   amplifying sound occurred in the searched direction of the sound source,
   wherein coordinates having the same arrival delay time about every pair of the microphones of coordinates in sound source direction search range are clustered to clusters, and clusters having arrival delay time smaller than preset value about the every pair of the microphones of the clusters are clustered into groups.

6. The method of claim 5, wherein the step of searching the direction of the sound source includes:
   calculating an output power of each of representative clusters in the groups,
   searching n groups in high order of the output power, wherein n is a natural number of above 1, and
   determining a location of coordinates having maximum output power of every coordinates in the n groups as the location of the sound source.

* * * * *